United States Patent
Robison et al.

(10) Patent No.: US 9,804,926 B1
(45) Date of Patent: Oct. 31, 2017

(54) CATALOGING FILE SYSTEM-LEVEL CHANGES TO A SOURCE STORAGE BETWEEN IMAGE BACKUPS OF THE SOURCE STORAGE

(71) Applicant: STORAGECRAFT TECHNOLOGY CORPORATION, Draper, UT (US)

(72) Inventors: Scott Robison, Herriman, UT (US); Nathan S. Bushman, Pleasant Grove, UT (US); Scott Barnes, Pleasant Grove, UT (US)

(73) Assignee: STORAGECRAFT TECHNOLOGY CORPORATION, Draper, UT (US)

( * ) Notice: Subject to any disclaimer, the term of this patent is extended or adjusted under 35 U.S.C. 154(b) by 9 days.

(21) Appl. No.: 15/097,140

(22) Filed: Apr. 12, 2016

(51) Int. Cl.
*G06F 17/30* (2006.01)
*G06F 11/14* (2006.01)
*G06F 3/06* (2006.01)

(52) U.S. Cl.
CPC ........ *G06F 11/1435* (2013.01); *G06F 3/0619* (2013.01); *G06F 11/1464* (2013.01); *G06F 17/30088* (2013.01); *G06F 17/30368* (2013.01); *G06F 17/30575* (2013.01); *G06F 2201/84* (2013.01)

(58) Field of Classification Search
CPC .................. G06F 17/30088; G06F 11/1451
USPC ........................................................ 707/625
See application file for complete search history.

(56) References Cited

U.S. PATENT DOCUMENTS

| | | | |
|---|---|---|---|
| 8,176,018 B1* | 5/2012 | Bisson | G06F 17/30144 707/690 |
| 8,719,521 B1* | 5/2014 | Barnes | G06F 11/1448 707/639 |
| 8,832,027 B1* | 9/2014 | Bushman | G06F 11/1469 707/639 |
| 9,152,507 B1* | 10/2015 | Bushman | G06F 11/1469 |
| 9,208,033 B1* | 12/2015 | Bushman | G06F 11/1451 |
| 9,361,301 B1* | 6/2016 | Bushman | G06F 17/30073 |
| 9,424,136 B1* | 8/2016 | Teater | G06F 3/065 |
| 2003/0028736 A1* | 2/2003 | Berkowitz | G06F 11/1451 711/162 |
| 2007/0174316 A1* | 7/2007 | Grubbs | G06F 17/30067 |
| 2011/0218966 A1* | 9/2011 | Barnes | G06F 17/30079 707/645 |
| 2011/0225141 A1* | 9/2011 | Chaudhry | G06F 17/30132 707/709 |
| 2012/0233172 A1* | 9/2012 | Skillcorn | G06F 11/1448 707/740 |

(Continued)

*Primary Examiner* — Nargis Sultana
(74) *Attorney, Agent, or Firm* — Maschoff Brennan (57) ABSTRACT

Cataloging file system-level changes to a source storage between image backups of the source storage. In one example embodiment, a method for cataloging file system-level changes to a source storage between image backups of the source storage may include obtaining first file system metadata (FSM) associated with a first image backup of the source storage that represents a first point in time, obtaining second FSM associated with a second image backup of the source storage that represents a second point in time, identifying a set of blocks that changed in the source storage between the first point in time and the second point in time, analyzing the set of blocks, the first FSM, and the second FSM, and cataloging files and/or directories that changed in the source storage between the first point in time and the second point in time based on the analyzing.

10 Claims, 3 Drawing Sheets

(56) References Cited

U.S. PATENT DOCUMENTS

2015/0149411 A1* 5/2015 Plisko ............... G06F 17/30174
  707/639
2016/0092311 A1* 3/2016 Bushman ............ G06F 11/1446
  707/646

* cited by examiner

CATALOGING FILE SYSTEM-LEVEL CHANGES TO A SOURCE STORAGE BETWEEN IMAGE BACKUPS OF THE SOURCE STORAGE

FIELD

The embodiments disclosed herein relate to cataloging file system-level changes to a source storage between image backups of the source storage.

BACKGROUND

A storage is computer-readable media capable of storing data in blocks. Storages face a myriad of threats to the data they store and to their smooth and continuous operation. In order to mitigate these threats, a backup of the data in a storage may be created to represent the state of the source storage at a particular point in time and to enable the restoration of the data at some future time. Such a restoration may become desirable, for example, if the storage experiences corruption of its stored data, if the storage becomes unavailable, or if a user wishes to create a second identical storage.

A storage is typically logically divided into a finite number of fixed-length blocks. A storage also typically includes a file system which tracks the locations of the blocks that are allocated to each file that is stored in the storage. The file system also tracks the blocks that are not allocated to any file. The file system generally tracks allocated and unallocated blocks using specialized data structures, referred to as file system metadata. File system metadata is also stored in designated blocks in the storage.

Various techniques exist for backing up a source storage. One common technique involves backing up individual files stored in the source storage on a per-file basis. This technique is often referred to as file backup. File backup uses the file system of the source storage as a starting point and performs a backup by writing the files to a destination storage. Using this approach, individual files are backed up if they have been modified since the previous backup. File backup may be useful for finding and restoring a few lost or corrupted files. However, file backup may also include significant overhead in the form of bandwidth and logical overhead because file backup requires the tracking and storing of information about where each file exists within the file system of the source storage and the destination storage.

Another common technique for backing up a source storage ignores the locations of individual files stored in the source storage and instead simply backs up all allocated blocks stored in the source storage. This technique is often referred to as image backup because the backup generally contains or represents an image, or copy, of the entire allocated contents of the source storage. Using this approach, individual allocated blocks are backed up if they have been modified since the previous backup. Because image backup backs up all allocated blocks of the source storage, image backup backs up both the blocks that make up the files stored in the source storage as well as the blocks that make up the file system metadata. Also, because image backup backs up all allocated blocks rather than individual files, this approach does not generally need to be aware of the file system metadata or the files stored in the source storage, beyond utilizing minimal knowledge of the file system metadata in order to only back up allocated blocks since unallocated blocks are not generally backed up.

An image backup can be relatively fast compared to file backup because reliance on the file system is minimized. An image backup can also be relatively fast compared to a file backup because seeking is reduced. In particular, during an image backup, blocks are generally read sequentially with relatively limited seeking. In contrast, during a file backup, blocks that make up the content of individual files may be scattered, resulting in relatively extensive seeking.

One common problem that is encountered during successive image backups of a source storage is the inability for a user to determine file system-level changes between the image backups. This problem arises due to image backup techniques generally only being aware of data changes on a block level, and not being aware of data changes on a file system level, such as changes to directories or files. A lack of awareness of file system-level changes in image backup techniques can be frustrating to a user when the user wishes to understand and/or diagnose file system-level changes that have occurred on a source storage between image backups of the source storage.

The subject matter claimed herein is not limited to embodiments that solve any disadvantages or that operate only in environments such as those described above. Rather, this background is only provided to illustrate one example technology area where some embodiments described herein may be practiced.

SUMMARY

In general, example embodiments described herein relate to cataloging file system-level changes to a source storage between image backups of the source storage. The example embodiments disclosed herein may be employed to analyze blocks that changed in a source storage between first and second image backups of the source storage, as well as to analyze certain file system metadata associated with the first image backup and the second image backup, in order to catalog files and/or directories that changed in the source storage between the first and second image backups. The example embodiments disclosed herein may therefore be employed to enable a user to understand and/or diagnose file system-level changes that have occurred on a source storage between image backups of the source storage.

In one example embodiment, a method for cataloging file system-level changes to a source storage between image backups of the source storage may include obtaining first file system metadata (FSM) associated with a first image backup of the source storage that represents a first point in time, obtaining second FSM associated with a second image backup of the source storage that represents a second point in time, identifying a set of blocks that changed in the source storage between the first point in time and the second point in time, analyzing the set of blocks, the first FSM, and the second FSM, and cataloging files and/or directories that changed in the source storage between the first point in time and the second point in time based on the analyzing.

In another example embodiment, a method for cataloging file system-level changes to a source storage between image backups of the source storage may include obtaining first file system metadata (FSM) associated with a first image backup of the source storage that represents a first point in time, obtaining second FSM associated with a second image backup of the source storage that represents a second point in time, identifying a set of blocks that changed in the source storage between the first point in time and the second point in time without performing a full compare of the first image backup and the second image backup, analyzing the set of blocks, the first FSM, and the second FSM, and cataloging files and/or directories that changed in the source storage between the first point in time and the second point in time based on the analyzing.

It is to be understood that both the foregoing general description and the following detailed description are explanatory and are not restrictive of the invention as claimed.

BRIEF DESCRIPTION OF THE DRAWINGS

Example embodiments will be described and explained with additional specificity and detail through the use of the accompanying drawings in which.

DESCRIPTION OF EMBODIMENTS

The term "storage" as used herein refers to computer-readable media capable of storing data in blocks, such as one or more floppy disks, optical disks, magnetic disks, or solid state (flash) disks, or some logical portion thereof such as a volume. The term "block" as used herein refers to a fixed-length discrete sequence of bits. In some file systems, blocks are sometimes referred to as "clusters." In some example embodiments, the size of each block may be configured to match the standard sector size of a storage on which the block is stored. For example, the size of each block may be 512 bytes (4096 bits) where 512 bytes is the size of a standard sector. In other example embodiments, the size of each block may be configured to be a multiple of the standard sector size of a storage on which the block is stored. For example, the size of each block may be 4096 bytes (32,768 bits) where 512 bytes (4096 bits) is the size of a standard sector, which results in each block including eight sectors. In some file systems, a block is the allocation unit of the file system, with the allocated blocks and free blocks being tracked by the file system. The term "allocated block" as used herein refers to a block in a storage that is currently tracked as storing data, such as file content data or metadata, by a file system of the storage. The term "free block" as used herein refers to a block in a storage that is not currently tracked as storing data, such as file content data or metadata, by a file system of the storage. The term "backup" when used herein as a noun refers to a copy or copies of one or more blocks from a storage. The term "full image backup" as used herein refers to a full image backup of a storage that includes at least a copy of each unique allocated block of the storage at a point in time such that the full image backup can be restored on its own to recreate the state of the storage at the point in time, without being dependent on any other backup. A "full image backup" may also include nonunique allocated blocks and free blocks of the storage at the point in time. An example file format for a "full image backup" is the ShadowProtect Full (SPF) image backup format. The term "incremental image backup" as used herein refers to an at least partial backup of a storage that includes at least a copy of each unique allocated block of the storage that was changed between a previous point in time of a previous backup of the storage and the subsequent point in time of the incremental image backup, such that the incremental image backup, along with all previous image backups of the storage, including an initial full image backup of the storage, can be restored together as an incremental image backup chain to recreate the state of the storage at the subsequent point in time. An "incremental image backup" may also include nonunique allocated blocks and free blocks of the storage that were changed between the previous point in time and the subsequent point in time. An example file format for an "incremental image backup" is the ShadowProtect Incremental (SPI) image backup format. The term "changed block" as used herein refers to a block that was changed either because the block was previously allocated and changed or because the block was changed by being newly allocated. The term "decremental image backup" as used herein refers to an at least partial backup of a storage that includes at least a copy of each unique allocated block from a full image backup of the storage that corresponds to a block that was changed in the source storage between a previous point in time and a subsequent point in time, such that the decremental image backup, along with all subsequent image backups of the storage, including a full image backup of the storage, can be restored together as a decremental image backup chain to recreate the state of the storage at the previous point in time. A "decremental image backup" may also include nonunique allocated blocks and free blocks from a full image backup of the storage that correspond to blocks that were changed in the source storage between the point in time and the subsequent point in time. It is understood that a "full image backup," an "incremental image backup," and/or a "decremental image backup" may exclude certain undesired allocated blocks such as content blocks belonging to files whose contents are not necessary for restoration purposes, such as virtual memory pagination files and machine hibernation state files.

Figure 1:
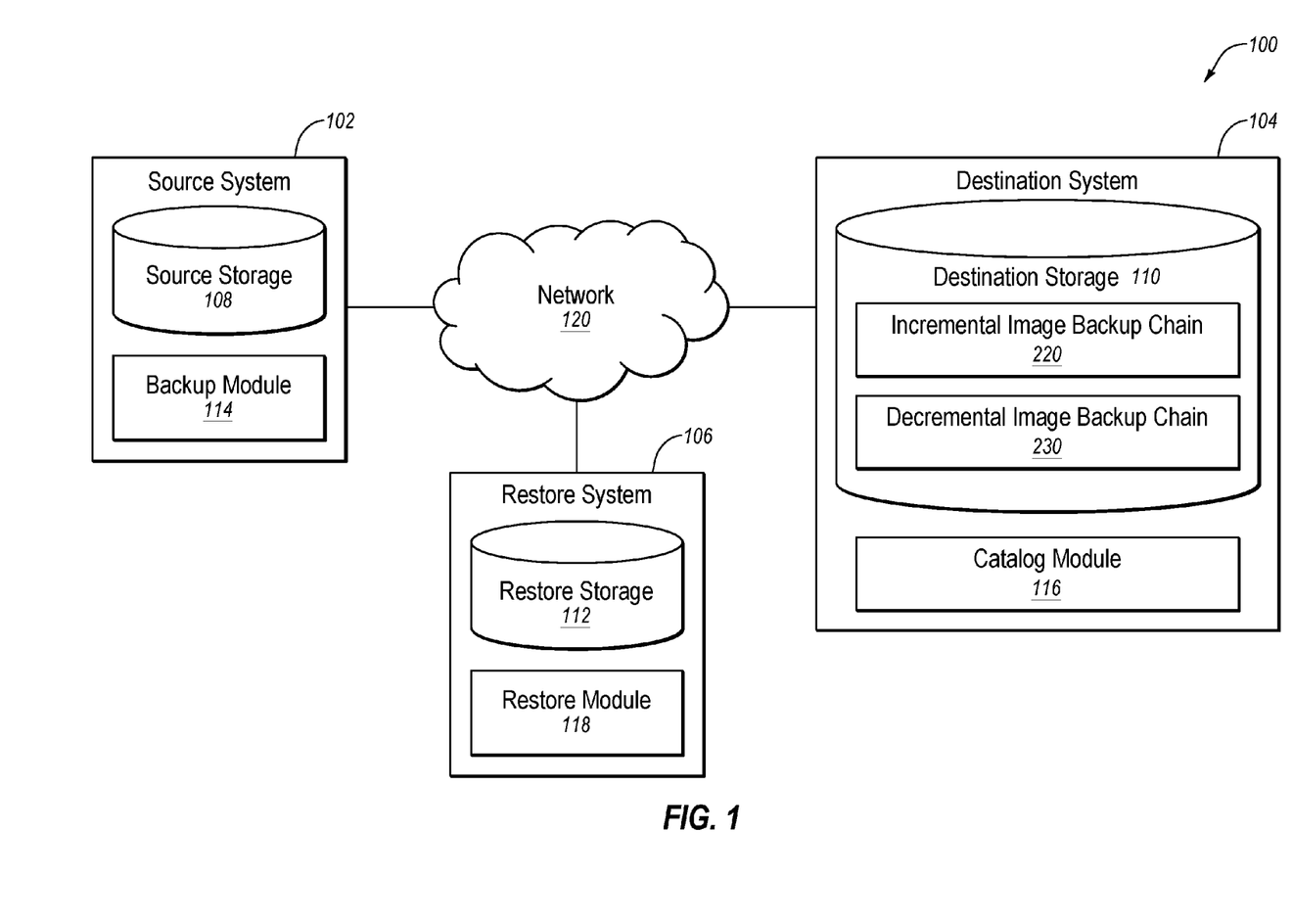
FIG. 1 is a schematic block diagram illustrating an example image backup and restore system.

FIG. 1 is a schematic block diagram illustrating an example image backup and restore system 100. As disclosed in FIG. 1, the system 100 may include a source system 102, a destination system 104, and a restore system 106. The systems 102, 104, and 106 may include storages 108, 110, and 112, respectively. The source system 102 may also include a backup module 114, the destination system 104 may also include a catalog module 116, and the restore system 106 may also include a restore module 118. The systems 102, 104, and 106 may be configured to communicate with one another over a network 120.

The destination storage 110 may store one or more image backups of the source storage 108. For example, the destination storage 110 may store an incremental image backup chain 220 and/or a decremental image backup chain 230. Any of the image backups in the incremental image backup chain 220 or the decremental image backup chain 230 may be restored to the restore storage 112.

Each of the systems 102, 104, and 106 may be any computing device capable of supporting a storage and communicating with other systems including, for example, file servers, web servers, personal computers, desktop computers, laptop computers, handheld devices, multiprocessor systems, microprocessor-based or programmable consumer electronics, smartphones, digital cameras, hard disk drives, flash memory drives, and virtual machines running on hypervisors. The network 120 may be any wired or wireless communication network including, for example, a Local Area Network (LAN), a Metropolitan Area Network (MAN), a Wide Area Network (WAN), a Wireless Application Protocol (WAP) network, a Bluetooth network, an Internet Protocol (IP) network such as the Internet, or some combination thereof. The network 120 may also be a network emulation of a hypervisor over which one or more virtual machines and/or physical machines may communicate.

The incremental image backup chain 220 and/or the decremental image backup chain 230 stored in the destination storage 110 may be created by the backup module 114. For example, the backup module 114 may be one or more programs that are configured, when executed, to cause one or more processors to perform image backup operations of creating a full image backup and one or more incremental image backups of the source storage 108 resulting in the incremental image backup chain 220, and/or creating a full image backup and one or more decremental image backups of the source storage 108 resulting in the decremental image backup chain 230. It is noted that these image backups may initially be created on the source system 102 and then copied to the destination system 104.

In one example embodiment, the destination system 104 may be a network server, the source system 102 may be a first desktop computer, the source storage 108 may be a volume on one or more magnetic hard drives of the first desktop computer, the restore system 106 may be a second desktop computer, the restore storage 112 may be a volume on one or more magnetic hard drives of the second desktop computer, and the network 120 may include the Internet. In this example embodiment, the first desktop computer may be configured to periodically back up the volume of the first desktop computer over the Internet to the network server as part of a backup job by creating the incremental image backup chain 220 and/or the decremental image backup chain 230 stored in the destination storage 110. The first desktop computer may also be configured to track incremental changes to its volume between backups in order to easily and quickly identify only those blocks that were changed for use in the creation of an incremental image backup or a decremental image backup. The second desktop computer may also be configured to restore one or more of the image backups from the network server over the Internet to the volume of the second desktop computer if the first desktop computer experiences corruption of its volume or if the first desktop computer's volume becomes unavailable.

Although only a single storage is disclosed in each of the systems 102, 104, and 106 in FIG. 1, it is understood that any of the systems 102, 104, and 106 may instead include two or more storages. Further, although the systems 102, 104, and 106 are disclosed in FIG. 1 as communicating over the network 120, it is understood that the systems 102, 104, and 106 may instead communicate directly with each other. For example, in some embodiments any combination of the systems 102, 104, and 106 may be combined into a single system, including embodiments where the source storage 108 represents the same storage as the restore storage 112. Further, although the backup module 114, the catalog module 116, and the restore module 118 are the only modules disclosed in the system 100 of FIG. 1, it is understood that the functionality of the modules 114, 116, and 118 may be replaced or augmented by one or more similar modules residing on any of the systems 102, 104, or 106 or another system. Finally, although only a single source storage and a single restore storage are disclosed in the system 100 of FIG. 1, it is understood that the destination system 104 of FIG. 1 may be configured to simultaneously back up multiple source storages and/or to simultaneously restore to multiple restore storages. For example, where the destination system 104 is configured as a deduplication system (that is capable of removing duplicate blocks within image backups and/or is capable of removing duplicate blocks between image backups), the greater the number of storages that are backed up to the destination storage 110 of the destination system 104, the greater the likelihood for reducing redundancy and for reducing the overall number of blocks being backed up, resulting in corresponding decreases in the overall size requirements of the destination storage 110 and in the bandwidth overhead of transporting blocks to the destination storage 110.

Having described one specific environment with respect to FIG. 1, it is understood that the specific environment of FIG. 1 is only one of countless environments in which the example methods disclosed herein may be practiced. The scope of the example embodiments is not intended to be limited to any particular environment.

Figure 2:
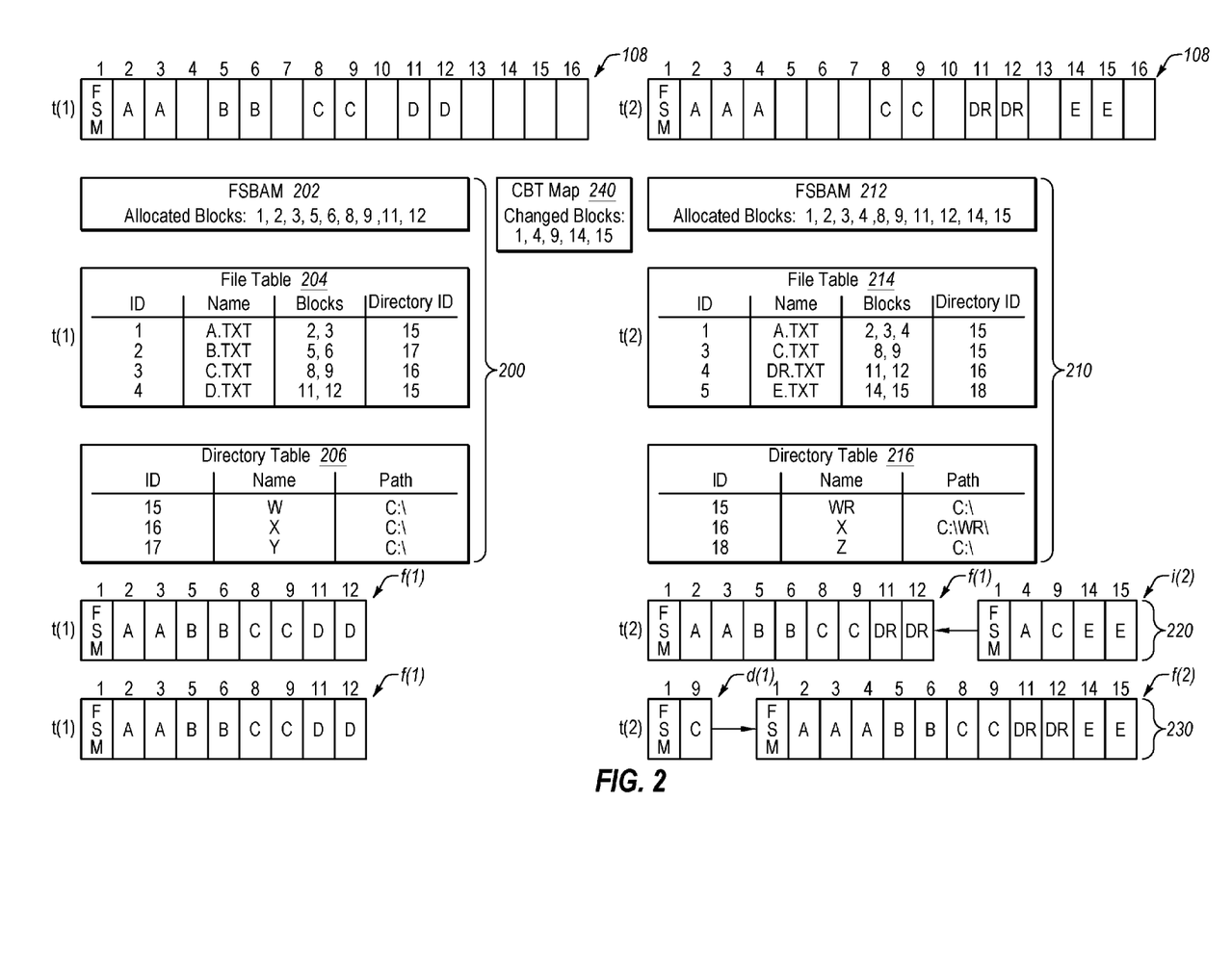
FIG. 2 is a schematic block diagram illustrating an example source storage, example file system metadata of the example source storage, an example incremental image backup chain of the example source storage, and an example decremental image backup chain of the example source storage.

FIG. 2 is a schematic block diagram illustrating the example source storage 108, example file system metadata (FSM) 200 and FSM 210 of the source storage 108, the example incremental image backup chain 220 of the source storage 108, and the example decremental image backup chain 230 of the source storage 108.

The source storage 108 is disclosed in FIG. 2 in a first state at time t(1) and in a second state at time t(2). Although the source storage 108 is depicted with sixteen blocks in FIG. 2, it is understood that the source storage 108 may include millions or billions of blocks, or potentially even more blocks. The blocks in FIG. 2 having a label therein represent blocks that are allocated at the time indicated, while the blank blocks represent blocks that are free at the time indicated. The labels in the blocks of FIG. 2 include a letter to identify the block as corresponding to file content of a particular file. For example, the label "A" in various blocks in FIG. 2 identifies the blocks as corresponding to file content of a file named "A.TXT."

As disclosed in FIG. 2, at time t(1) the source storage 108 includes FSM 200 in block (1), and at time t(2) the source storage 108 includes FSM 210 in block (1). The FSM 200 includes a file system block allocation map (FSBAM) 202, a file table 204, and a directory table 206. Similarly, the FSM 210 includes an FSBAM 212, a file table 214, and a directory table 216. The changes between the first state at time t(1) and the second state at time t(2) of the source storage 108 may be determined by analyzing the differences between the FSM 200 and the FSM 210, as well as by analyzing a changed block tracking (CBT) map 240.

The CBT map 240 may be implemented, for example, as a bitmap where each bit corresponds to a block in the source storage 108, with the bit being set to "1" to represent a changed block and the bit being set to "0" to represent an unchanged block, or vice versa. Alternatively, the CBT map 240 may be implemented as any other data structure capable of representing changed blocks and/or unchanged blocks such as, for example, as a run-length encoded list of bits corresponding to the blocks in the source storage 108. At time t(0) the CBT map 240 may be initialized to indicate that no blocks in the source storage 108 are changed. Then, as writes are executed on the source storage 108, the blocks in the source storage 108 that are written to may be tracked as changed in the CBT map 240, such that all writes between time t(1) and t(2) are tracked in the CBT map 240. As disclosed in FIG. 2, the CBT map 240 indicates that blocks (1), (4), (9), (14), and (15) were changed between time t(1) and time t(2). As will be discussed in greater detail below, blocks (1) and (9) were previously allocated and changed and blocks (4), (14), and (15) were changed by being newly allocated.

The FSBAM 202 and the FSBAM 212 may be employed to track, at the time indicated, which blocks of the source storage 108 are allocated and/or which blocks of the storage are free. Similar to the CBT map 240, the FSBAM 202 and the FSBAM 212 may be implemented, for example, as bitmaps where each bit corresponds to a block in the source storage 108, with the bit being set to "1" to represent an allocated block and the bit being set to "0" to represent a free block, or vice versa. Alternatively, the FSBAM 202 and the FSBAM 212 may be implemented as any other data structure capable of representing changed blocks and/or unchanged blocks such as, for example, as a run-length encoded list of bits corresponding to the blocks in the source storage 108. Identifying blocks that changed between time t(1) and time t(2) can be accomplished, at least in part, by comparing the FSBAM 212 to the FSBAM 202. For example, it can be determined that blocks (4), (14), and (15) were changed by being newly allocated between time t(1) and time t(2) by comparing the FSBAM 212 to the FSBAM 202.

The file table 204 and the file table 214 may be employed to track, at the time indicated, file information, such as a file ID, a file name, file blocks, and a directory ID, for the files stored in the source storage 108. Identifying files that changed between time t(1) and time t(2) can be accomplished, at least in part, by comparing the file table 214 to the file table 204. For example, by comparing the file table 214 to the file table 204, it can be determined that files in the source storage 108 were changed between time t(1) and time t(2) as follows: the file with ID (1) was modified by being enlarged from having content in blocks (2) and (3) to having content in blocks (2), (3), and (4); the file with ID (2) was deleted; the file with ID (3) was moved from the directory with ID (16) to the directory with ID (15); the file with ID (4) was modified by being renamed from "D.TXT" to "DR.TXT"; and the file with ID (5) was newly created. It is understood that file attributes other than those shown in the file tables 204 and 214 of FIG. 2 may additionally or alternatively be tracked in the file tables 204 and 214 (or elsewhere) and compared to identify files that changed between time t(1) and time t(2). Such file attributes may include, but are not limited to, revision number, version number, content created, date last saved, total editing time, pages, word count, character count, line count, paragraph count, size, date created, and date modified.

The directory table 206 and the directory table 216 may be employed to track, at the time indicated, directory information, such as a directory ID, a directory name, and a directory path, for the directories stored in the source storage 108. Identifying directories that changed between time t(1) and time t(2) can be accomplished, at least in part, by comparing the directory table 216 to the directory table 206. For example, by comparing the directory table 216 to the directory table 206, it can be determined that directories in the source storage 108 were changed between time t(1) and time t(2) as follows: the directory with ID (15) was modified by being renamed from "W" to "WR"; the directory with ID (16) was moved from path "C: \" to path "C: \WR\"; the directory with ID (17) was deleted; and the directory with ID (18) was newly created. It is understood that directory attributes other than those shown in the directory tables 206 and 216 of FIG. 2 may additionally or alternatively be tracked in the directory tables 206 and 216 (or elsewhere) and compared to identify directories that changed between time t(1) and time t(2). Such directory attributes may include, but are not limited to, size, size on disk, contains, created, and modified.

The example incremental image backup chain 220 includes a full image backup f(1) and an incremental image backup i(2), which represent the states of the source storage 108 at times t(1) and t(2), respectively. As disclosed in FIGS. 1 and 2, in one example embodiment, the backup module 114 may create the full image backup f(1) and the incremental image backup i(2) of the source storage 108 and store them in the destination storage 110.

As disclosed in FIGS. 1 and 2, the full image backup f(1) may be created to preserve the state of the source storage 108 at time t(1). This creation of the full image backup f(1) may include the backup module 114 copying all allocated blocks of the source storage 108 as allocated at time t(1) and storing the allocated blocks in the destination storage 110. The state of the source storage 108 at time t(1) may be captured using snapshot technology in order to capture the data stored in the source storage 108 at time t(1) without interrupting other processes, thus avoiding downtime of the source storage 108. In this example, blocks (1), (2), (3), (5), (6), (8), (9), (11), and (12) are allocated in the source storage 108 at time t(1), and these blocks are therefore stored as part of the full image backup f(1). The full image backup f(1) may be very large depending on the size of the source storage 108 and the number of allocated blocks at time t(1). As a result, the full image backup f(1) may take a relatively long time to create and consume a relatively large amount of space in the destination storage 110.

Next, the incremental image backup i(2) may be created to capture the state at time t(2). This may include copying only changed allocated blocks of the source storage 108 present at time t(2) and storing the changed allocated blocks in the destination storage 110. The state of the source storage 108 at time t(2) may also be captured using a snapshot, thus avoiding downtime of the source storage 108. The incremental image backup i(2) may include only those allocated blocks from the source storage 108 that were changed between time t(1) and time t(2). In this example, blocks (1), (4), (9), (14), and (15) are changed in the source storage 108 between time t(1) and time t(2), as indicated in the CBT map 240, and these blocks are therefore stored as part of the incremental image backup i(2). In general, as compared to the full image backup f(1), the incremental image backup i(2) may take a relatively short time to create and consume a relatively small storage space in the destination storage 110.

Further, additional incremental image backups may be created in the incremental image backup chain 220 on an ongoing basis. The frequency of creating new incremental image backups in the incremental image backup chain 220 may be altered as desired in order to adjust the amount of data that will be lost should the source storage 108 experience corruption of its stored blocks or become unavailable at any given point in time. The blocks from the source storage 108 can be restored to the state at the point in time of a particular incremental image backup by applying the image backups to the restore storage 112 from oldest to newest, namely, first applying the full image backup f(1) and then applying each successive incremental image backup up to the particular incremental image backup. For example, the data from the source storage 108 can be restored to the state at time t(2) by applying the full image backup f(1) and then applying the incremental image backup i(2). Alternatively, the blocks from the source storage 108 can be restored to the state at the point in time of a particular incremental image backup by applying the image backups to the restore storage 112 concurrently, namely, concurrently applying the full image backup f(1) and each successive incremental image backup up to the particular incremental image backup. For example, the data from the source storage 108 can be restored to the state at time t(2) accessing the full image backup f(1) and the incremental image backup i(2) concurrently, and retrieving from each backup the correct block content corresponding to time t(2).

The example decremental image backup chain 230 includes full image backups f(1) and f(2), which represent the states of the source storage 108 at times t(1) and t(2), respectively. In addition, the example decremental image backup chain 230 includes decremental d(1), which represents the state of the source storage 108 at time t(1). As disclosed in FIGS. 1 and 2, in one example embodiment, the backup module 114 may create the full image backups f(1) and f(2) and the decremental image backup d(1) of the source storage 108 and store them in the destination storage 110.

The full image backup f(1) in the decremental image backup chain 230 may be created to preserve the state of the source storage 108 at time t(1), and may generally be created in a similar manner as the creation of, and include the same blocks as, the full image backup f(1) in the incremental image backup chain 220, although the format of the full image backup f(1) in the decremental image backup chain 230 may be different due to the full image backup f(1) in the decremental image backup chain 230 being formatted for use in the decremental image backup chain 230 instead of the incremental image backup chain 220. In particular, the full image backup f(1) in the decremental image backup chain 230 may have a randomly-writeable format in order to allow the full image backup f(1) in the decremental image backup chain 230 to have new blocks inserted into the full image backup f(1) at various positions, while the full image backup f(1) in the incremental image backup chain 220 may have only a sequentially-writeable format since the full image backup f(1) in the incremental image backup chain 220 may not ever need to have new blocks inserted therein at various positions.

Next, the decremental image backup d(1) may be created to preserve the state of the source storage 108 at time t(1) while the full image backup f(1) is updated to capture the state of the source storage 108 at time t(2), resulting in the updated full image backup f(2). This may be accomplished by the backup module 114 identifying previously allocated blocks in the source storage 108 that changed between time t(1) and time t(2), as well as blocks that were changed by being newly allocated in the source storage 108 between time t(1) and time t(2). In this example, between time t(1) and time t(2), blocks (1) and (9) were previously allocated and changed, and blocks (4), (14), and (15) were changed by being newly allocated, as can be determined from a combination of the CBT map 240 and the full image backup f(1). The backup module 114 may then identify original blocks in the full image backup f(1) with the same positions as the previously-allocated changed blocks in the source storage 108, namely blocks (1) and (9) in the full image backup f(1), and copy these original blocks (1) and (9) from the full image backup f(1) into the decremental image backup d(1). The changed allocated blocks and newly-allocated blocks from the source storage 108, namely the changed allocated blocks (1) and (9) and newly-allocated blocks (4), (14), and (15) of the source storage 108, are then added to the full image backup f(1), resulting in the updated full image backup f(2). As a result, the decremental image backup d(1) represents the state of the source storage 108 at time t(1) and the updated full image backup f(2) represents the state of the source storage 108 at time t(2).

Further, additional decremental image backups may be created on an ongoing basis. The frequency of creating new decremental image backups may be altered as desired in order to adjust the amount of data that will be lost should the source storage 108 experience corruption of its stored data or become unavailable at any given point in time. The data from the source storage 108 can be restored to the state at the point in time of a particular decremental image backup by applying the image backups to a restore storage from newest to oldest, namely, first applying the full image backup and then applying each successive decremental incremental image backup back to the particular decremental image backup. For example, the data from the source storage 108 can be restored to the state at time t(1), after time t(2), by applying the full image backup f(2) and then applying the decremental image backup d(1). Alternatively, the data from the source storage 108 can be restored to the state at the point in time of a particular decremental image backup by applying the image backups to a restore storage concurrently, namely, concurrently applying the full image backup and each successive decremental image backup back to the particular decremental image backup. For example, the data from the source storage 108 may be restored to the state at time t(1), after time t(2), by accessing the full image backup f(2) and the decremental image backup d(1) concurrently, and retrieving from each backup the correct block content corresponding to time t(1). Advantageously, the most recent backup state of the source storage 108 can be restored at any stage of the decremental image backup chain 230 by simply applying the full image backup of the decremental image backup chain 230.

Although only allocated blocks are included in the example incremental image backup chain 220 and in the example decremental image backup chain 230 discussed above, it is understood that in alternative implementations both allocated and free blocks may be backed up during the creation of a full image backup, an incremental image backup, or a decremental image backup. This is typically done for forensic purposes, because the contents of free blocks can be interesting where the free blocks contain data from a previous point in time when the blocks were in use and allocated. Therefore, the creation of full image backups, incremental image backups, and decremental image backups as disclosed herein is not limited to allocated blocks but may also include free blocks.

In general, as compared to the full image backup f(1), the decremental image backup d(1) may take a relatively short period of time to create and consume a relatively small storage space in the destination storage 110. However, as compared to the incremental image backups i(2), the decremental image backup d(1) may take a relatively longer period of time to create, due at least in part to the updating of the corresponding full image backup f(2) that is associated with the decremental image backup d(1). In addition to taking longer to create, the creation of the decremental image backup d(1) may also be more resource intensive than the creation of the incremental image backup i(2). Further, the creation of the decremental image backup d(1) may require exclusive access to the corresponding full image backup f(2), while the creation of the incremental image backup i(2) may be accomplished without exclusive access to the full image backup f(1). Due at least in part to the relative advantages and disadvantages of incremental image backups versus decremental image backups, the example methods disclosed herein may be employed with either or both of incremental image backup chains and decremental image backup chains.

Figure 3:
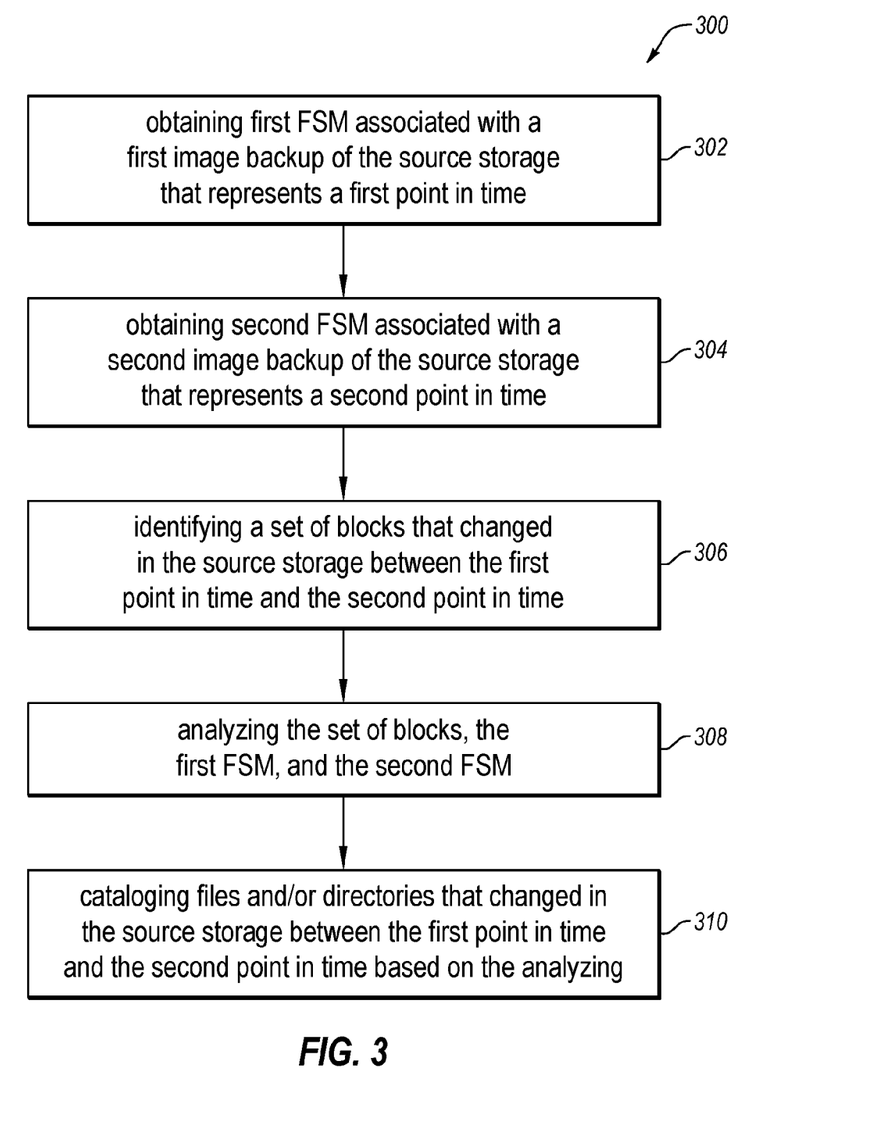
FIG. 3 is a schematic flowchart illustrating an example method for cataloging file system-level changes to a source storage between image backups of the source storage.

FIG. 3 is a schematic flowchart illustrating an example method 300 for cataloging file system-level changes to a source storage between image backups of the source storage. The method 300 may be implemented, in at least some embodiments, by one or more of the backup module 114, the catalog module 116, and the restore module 118 of FIG. 1. For example, the backup module 114, the catalog module 116, and the restore module 118 may each be one or more programs, stored on one or more non-transitory computer-readable media, that are configured, when executed, to cause one or more processors to perform one or more of the steps of the method 300. Although illustrated as discrete steps, various steps may be divided into additional steps, combined into fewer steps, reordered, or eliminated, depending on the desired implementation. The method 300 will be discussed with reference to FIGS. 1, 2, and 3.

The method 300 of FIG. 3 may include step 302 of obtaining first FSM associated with a first image backup of the source storage that represents a first point in time. For example, the catalog module 116 of FIG. 1 may obtain, at step 302, the FSM 200 from block (1) of the full image backup f(1) associated with the incremental image backup chain 220 or associated with the decremental image backup chain 230, each of which is an image backup of the source storage 108 that represents the state of the source storage 108 at time t(1), as disclosed in FIG. 2. The FSM 200 may include the FSBAM 202, the file table 204, or the directory table 206, or some combination thereof.

The method 300 of FIG. 3 may include step 304 of obtaining second FSM associated with a second image backup of the source storage that represents a second point in time. For example, the catalog module 116 of FIG. 1 may obtain, at step 304, the FSM 210 from block (1) of the incremental image backup i(2) associated with the incremental image backup chain 220 or from the full image backup f(2) associated with the decremental image backup chain 230, each of which is an image backup of the source storage 108 that represents the state of the source storage 108 at time t(2), as disclosed in FIG. 2. The FSM 210 may include the FSBAM 212, the file table 214, or the directory table 216, or some combination thereof.

In at least some example embodiments, the obtaining of the first FSM or the second FSM at step 302 or step 304 may include reconstructing the first FSM or the second FSM from an image backup and from one or more previous or subsequent image backups of the source storage, such as where the first FSM spans two or more blocks in the source storage and the corresponding blocks are found in two or more image backups of the source storage.

The method 300 of FIG. 3 may include step 306 of identifying a set of blocks that changed in the source storage between the first point in time and the second point in time. For example, the catalog module 116 of FIG. 1 may identify, at step 306, a set of blocks (1), (4), (5), (6), (9), (14), and (15) that were changed in the source storage 108 between time t(1) and time t(2). In at least some example embodiments, the identifying of the set of blocks that changed may be performed without performing a full compare of the first image backup and the second image backup.

The identifying of the set of blocks that changed at step 306 may include identifying, as being included in the set of blocks that changed, blocks included in an incremental image backup corresponding to the second point in time. For example, the catalog module 116 of FIG. 1 may identify, at step 306, blocks (1), (4), (9), (14), and (15) as being included in the set of blocks that changed because these blocks are included in the incremental image backup i(2) that represents the state of the source storage 108 at time t(2). As noted previously, blocks (1) and (9) were previously allocated and changed and blocks (4), (14), and (15) were changed by being newly allocated. In this example, the identifying of the set of blocks that changed is performed without performing a full compare of the first image backup and the second image backup.

The identifying of the set of blocks that changed at step 306 may include identifying, as being included in the set of blocks that changed, blocks included in a subsequent full image backup, corresponding to the second point in time, that correspond to block positions of blocks included in a decremental image backup corresponding to the first point in time. For example, the catalog module 116 of FIG. 1 may identify, at step 306, blocks (1) and (9) from the full image backup f(2), corresponding to time t(2), that correspond to block positions (1) and (9) of blocks (1) and (9) included in the decremental image backup d(1), corresponding to time t(1), as being included in the set of blocks that changed. As noted previously, blocks (1) and (9) were previously allocated. In this example, the identifying of the set of blocks that changed is performed without performing a full compare of the first image backup and the second image backup.

The identifying of the set of blocks that changed at step 306 may include identifying, as being included in the set of blocks that changed, blocks that are designated as allocated in an FSBAM of the first FSM but are designated as free in an FSBAM of the second FSM. For example, the catalog module 116 of FIG. 1 may identify, at step 306, blocks (5) and (6) as also being included in the set of blocks that changed because these blocks are designated as allocated in the FSBAM 202 of the FSM 200 but are designated as free in the FSBAM 212 of the FSM 210. As noted previously, blocks (5) and (6) were changed by being deleted. In this example, the identifying of the set of blocks that changed is performed without performing a full compare of the first image backup and the second image backup.

The method 300 of FIG. 3 may include step 308 of analyzing the set of blocks, the first FSM, and the second FSM. For example, the catalog module 116 of FIG. 1 may analyze, at step 308, the set of blocks (1), (4), (5), (6), (9), (14), and (15) that changed, the FSM 200, and the FSM 210, as disclosed in FIG. 2.

In at least some example embodiments, the analyzing at step 308 may include identifying file content blocks in the set of blocks and identifying the files to which the file content blocks belong. For example, the catalog module 116 of FIG. 1 may identify, at step 308, file content blocks (4), (5), (6), (9), (14), and (15) in the set of blocks that changed and then identify that the file content blocks (4), (5), (6), (9), (14), and (15) belong to the files with IDs (1), (2), (3), and (5). This identifying may be performed by analyzing the file table 204 of the FSM 200 and the file table 214 of the FSM 210.

In at least some example embodiments, the analyzing at step 308 may include identifying hybrid metadata/file content blocks in the set of blocks, identifying the hybrid metadata/file content blocks where file content portions changed, and identifying the files to which the changed file content portions belong. For example, the catalog module 116 of FIG. 1 may identify, at step 308, hybrid FSM/file content blocks (in which single blocks include both FSM as well as file content) in the set of blocks that changed. The catalog module 116 of FIG. 1 may then narrow the list of hybrid FSM/file content blocks to those blocks where the file content portions of the blocks changed, instead of where only the FSM portions of the blocks changed. The catalog module 116 of FIG. 1 may then identify the files to which the changed file content portions belong by, for example, analyzing the file table 204 of the FSM 200 and the file table 214 of the FSM 210.

In at least some example embodiments, the analyzing at step 308 may include comparing the first FSM to the second FSM to identify the files and/or the directories that changed. For example, the file table 204 of the FSM 200 may be compared to the file table 214 of the FSM 210 to identify the following file changes: the file with ID (1) was modified by being enlarged from having content in blocks (2) and (3) to having content in blocks (2), (3), and (4); the file with ID (2) was deleted; the file with ID (3) was moved from the directory with ID (16) to the directory with ID (15); the file with ID (4) was modified by being renamed from "D.TXT" to "DR.TXT"; and the file with ID (5) was newly created. In another example, the directory table 206 of the FSM 200 may be compared to the directory table 216 of the FSM 210 to identify the following directory changes: the directory with ID (15) was modified by being renamed from "W" to "WR"; the directory with ID (16) was moved from path "C:\" to path "C: \WR\"; the directory with ID (17) was deleted; and the directory with ID (18) was newly created.

The method 300 of FIG. 3 may include step 310 of cataloging files and/or directories that changed in the source storage between the first point in time and the second point in time based on the analyzing. For example, the catalog module 116 of FIG. 1 may catalog, at step 310, that various files and directories changed in the source storage 108 between time t(1) and t(2) based on the analyzing performed at step 308. These changes may include files or directories that were deleted, modified, or created, or some combination thereof. For example, the changes to the files disclosed in FIG. 2 include: the file with ID (1) was modified by being enlarged from having content in blocks (2) and (3) to having content in blocks (2), (3), and (4); the file with ID (2) was deleted; the file with ID (3) was moved from the directory with ID (16) to the directory with ID (15); the file with ID (4) was modified by being renamed from "D.TXT" to "DR.TXT"; and the file with ID (5) was newly created. Further, the changes to the directories disclosed in FIG. 2 include: the directory with ID (15) was modified by being renamed from "W" to "WR"; the directory with ID (16) was moved from path "C: \" to path "C:\WR\"; the directory with ID (17) was deleted; and the directory with ID (18) was newly created. The catalog module 116 of FIG. 1 may therefore catalog, at step 310, these changes to the files and directories of the source storage 108.

Therefore, the example method 300 disclosed herein may be employed to analyze blocks that changed in the source storage 108 between first and second image backups of the source storage 108, as well as to analyze the FSM 200 and FSM 210 associated with the first image backup and the second image backup, in order to catalog the files and directories that changed in the source storage 108 between the first and second image backups. The example method 300 disclosed herein may therefore be employed to enable a user to understand and/or diagnose file system-level changes that have occurred on the source storage 108 between image backups of the source storage 108. It is understood that the foregoing discussion of the method 300 is but one possible implementation of a method for cataloging file system-level changes to a source storage between image backups of the source storage, and various modifications are possible and contemplated. For example, the method 300 may be modified to combine the steps 302 and 304, and/or to combine the steps 308 and 310. In another example embodiment, the method 300 may be modified to delete the step 306, and modify the step 308 to only analyze the first FSM and the second FSM.

Further, the method 300 may improve the functioning of a computer itself. For example, the functioning of the source system 102 (i.e., a computing device capable of supporting a storage and communicating with other systems) itself may be improved by the method 300 at least because the first and second backups of the source storage 108 of the source system 102 that are employed in the method 300 may enable the restoration of the source storage 108 if, for example, the source storage 108 experiences corruption of its stored data, the source storage 108 becomes unavailable, or a user wishes to create a second identical or virtual source storage 108. Also, the method 300 may improve the technical field of backup and disaster recovery (BDR). For example, the technical field of BDR may be improved by the method 300 at least because prior art image backups of the source storage 108 did not enable a user to understand and/or diagnose file system-level changes that had occurred on the source storage 108 between image backups of the source storage 108, whereas the method 300 may be employed to enable a user to understand and/or diagnose file system-level changes that have occurred on the source storage 108 between image backups of the source storage 108, thus improving the usability of the image backup for the user.

The embodiments described herein may include the use of a special-purpose or general-purpose computer, including various computer hardware or software modules, as discussed in greater detail below.

Embodiments described herein may be implemented using non-transitory computer-readable media for carrying or having computer-executable instructions or data structures stored thereon. Such computer-readable media may be any available media that may be accessed by a general-purpose or special-purpose computer. By way of example, and not limitation, such computer-readable media may include non-transitory computer-readable storage media including RAM, ROM, EEPROM, CD-ROM or other optical disk storage, magnetic disk storage or other magnetic storage devices, or any other storage medium which may be used to carry or store one or more desired programs having program code in the form of computer-executable instructions or data structures and which may be accessed and executed by a general-purpose computer, special-purpose computer, or virtual computer such as a virtual machine. Combinations of the above may also be included within the scope of computer-readable media.

Computer-executable instructions comprise, for example, instructions and data which, when executed by one or more processors, cause a general-purpose computer, special-purpose computer, or virtual computer such as a virtual machine to perform a certain method, function, or group of methods or functions. Although the subject matter has been described in language specific to structural features and/or methodological steps, it is to be understood that the subject matter defined in the appended claims is not necessarily limited to the specific features or steps described above. Rather, the specific features and steps described above are disclosed as example forms of implementing the claims.

As used herein, the term "module" may refer to software objects or routines that execute on a computing system. The different modules described herein may be implemented as objects or processes that execute on a computing system (e.g., as separate threads). While the system and methods described herein are preferably implemented in software, implementations in hardware or a combination of software and hardware are also possible and contemplated.

All examples and conditional language recited herein are intended for pedagogical objects to aid the reader in understanding the example embodiments and the concepts contributed by the inventor to furthering the art, and are to be construed as being without limitation to such specifically-recited examples and conditions.

The invention claimed is:

1. A computer-implemented method for cataloging file system-level changes to a
   source storage between image backups of the source storage, the method comprising:
   obtaining first file system metadata (FSM) associated with a first image backup of the source storage that represents a first point in time;
   obtaining second FSM associated with a second image backup of the source storage that represents a second point in time;
   identifying a set of blocks that changed in the source storage between the first point in time and the second point in time without performing a full compare of the first image backup and the second image backup;
   analyzing the set of blocks, the first FSM, and the second FSM to:
      identify hybrid FSM-file content blocks, each of which being a single block that includes FSM in an FSM portion as well as file content in a file content portion, in the set of blocks where file content portions of the hybrid FSM-file content blocks changed; and
      identify files to which the changed file content portions belong; and
   cataloging the files to which the changed file content portions belong as files and/or directories that changed in the source storage between the first point in time and the second point in time based on the analyzing.

2. The method as recited in claim 1, wherein the first image backup is a decremental image backup.

3. The method as recited in claim 2, wherein the obtaining of the first FSM includes reconstructing the first FSM from the decremental image backup and from one or more subsequent image backups of the source storage.

4. The method as recited in claim 2, wherein the identifying of the set of blocks that changed includes identifying, as being included in the set of blocks that changed, blocks included in a subsequent full image backup that correspond to block positions of blocks included in the decremental image backup.

5. The method as recited in claim 4, wherein the identifying of the set of blocks that changed further includes identifying, as being included in the set of blocks that changed, blocks that are designated as allocated in a file system block allocation map (FSBAM) of the first FSM but are designated as free in an FSBAM of the second FSM.

6. The method as recited in claim 1, further comprising cataloging directories that changed in the source storage between the first point in time and the second point in time.

7. The method as recited in claim 1, wherein the analyzing of the set of blocks, the first FSM, and the second FSM further includes:
   identifying file content blocks in the set of blocks; and
   identifying the files to which the file content blocks belong, and
   the method further includes cataloging the files to which the file content blocks belong as files that changed in the source storage between the first point in time and the second point in time.

8. The method as recited in claim 6, wherein the analyzing of the set of blocks, the first FSM, and the second FSM further includes comparing the first FSM to the second FSM to identify the files and/or the directories that changed between the first point in time and the second point in time.

9. One or more non-transitory computer-readable media storing one or more programs that are configured, when executed, to cause one or more processors to perform the method as recited in claim 1.

10. The method as recited in claim 6, wherein the cataloging of the files and/or the directories that changed includes cataloging the files that were deleted, modified, or created, or some combination thereof; and/or
    the cataloging of the directories that changed includes cataloging the directories that were deleted, modified, or created, or some combination thereof.

* * * * *